(12) United States Patent
Darcel

(10) Patent No.: US 8,910,395 B2
(45) Date of Patent: Dec. 16, 2014

(54) INSTALLATION FOR THE TREATMENT OF SLUDGES

(75) Inventor: Loic Darcel, Versailles (FR)

(73) Assignee: Aqualter, Chartres (FR)

( * ) Notice: Subject to any disclaimer, the term of this patent is extended or adjusted under 35 U.S.C. 154(b) by 713 days.

(21) Appl. No.: 13/178,873

(22) Filed: Jul. 8, 2011

(65) Prior Publication Data
US 2012/0017461 A1    Jan. 26, 2012

(30) Foreign Application Priority Data
Jul. 22, 2010    (FR) .................................... 10 03079

(51) Int. Cl.
| | |
|---|---|
| F26B 25/08 | (2006.01) |
| F26B 25/04 | (2006.01) |
| F26B 9/08 | (2006.01) |
| F26B 19/00 | (2006.01) |
| C02F 11/16 | (2006.01) |
| B01F 7/00 | (2006.01) |
| B01F 7/04 | (2006.01) |
| F26B 3/28 | (2006.01) |

(52) U.S. Cl.
CPC ............. *C02F 11/16* (2013.01); *B01F 7/0025* (2013.01); *B01F 7/04* (2013.01); *F26B 3/286* (2013.01); *F26B 9/082* (2013.01); *F26B 25/04* (2013.01); *C02F 2203/006* (2013.01); *C02F 2303/02* (2013.01); *C02F 2303/06* (2013.01); *C02F 2303/10* (2013.01); *F26B 2200/18* (2013.01)
USPC .................................. 34/229; 34/237; 34/241

(58) Field of Classification Search
CPC .......... F26B 3/286; F26B 25/04; F26B 11/22; F26B 11/14; F26B 3/04; F26B 9/02; F26B 9/08; F26B 9/082; F26B 9/10; F26B 25/02; F26B 21/08; F26B 21/024; B01F 7/0225; C02F 11/16

USPC ........... 34/201, 202, 218, 229–233, 237, 241, 34/305, 307, 309, 311, 508, 95, 95.1, 95.3
See application file for complete search history.

(56) References Cited

U.S. PATENT DOCUMENTS

| | | | | |
|---|---|---|---|---|
| 223,086 | A | * 12/1879 | Weinig .......................... | 366/346 |
| 417,488 | A | * 12/1889 | Johnson et al. ................. | 34/181 |

(Continued)

FOREIGN PATENT DOCUMENTS

| | | |
|---|---|---|
| DE | 43 15 321 A1 | 11/1994 |
| DE | 20 2006 011052 U1 | 10/2006 |

(Continued)

OTHER PUBLICATIONS

Luboschik U: "Solar Sludge drying—based on the IST Process", Renewable Energy, Pergamon Press, Oxford, GB,, vol. 16, No. 1-4, Jan. 4, 1999, pp. 785-788, XP004138114, ISSN: 0960-1481, DOI: 10.1016/S0960-1481(98)00281-X, p. 786; figure 2, Cited in French Search Report.

(Continued)

*Primary Examiner* — Kenneth Rinehart
*Assistant Examiner* — Tavia Sullens
(74) *Attorney, Agent, or Firm* — Young & Thompson

(57) ABSTRACT

In a sludge treatment installation, a movable carriage is arranged transversely above a work surface of a floor. The movement of the carriage by longitudinal translation over the floor is initiated by a first drive shaft carrying a toothed wheel meshing with a drive chain. A second chain helps to guide the carriage. On the carriage is provided a rotary turning tool which engages in the sludge. Driven in rotation by a second drive shaft independent of the first, it includes pairs of semi-cylindrical paddles fixed substantially symmetrically by one of their edges on either side of a shaft driven by the second drive shaft. The two paddles in each pair of paddles are asymmetrical as a result of having different radii, with a difference at least equal to about 5%. Forced ventilation acts directly on the paddles.

10 Claims, 3 Drawing Sheets

(56) References Cited

U.S. PATENT DOCUMENTS

Figure 1:
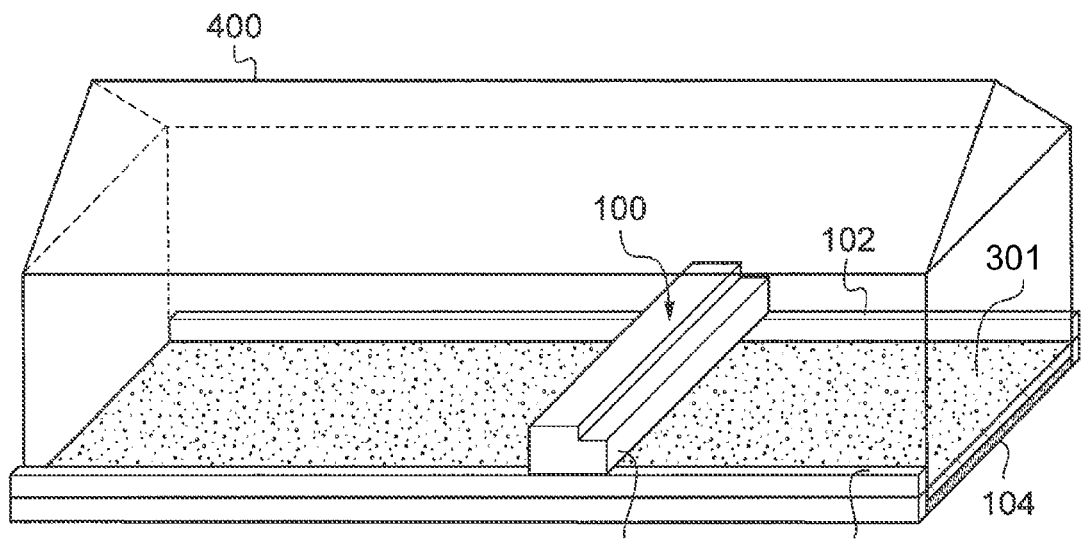

| | | | |
|---|---|---|---|
| 505,945 A * | 10/1893 | Hochmuth | 366/346 |
| 673,835 A * | 5/1901 | Franzl et al. | 366/346 |
| 748,875 A * | 1/1904 | Mueller | 34/241 |
| 1,139,362 A * | 5/1915 | Minich | 366/346 |
| 1,827,358 A * | 10/1931 | Giletti | 366/346 |
| 2,279,848 A * | 4/1942 | Unger, Jr. | 34/181 |
| 3,004,277 A * | 10/1961 | Allred | 34/232 |
| 3,613,893 A | 10/1971 | Schreiber | |
| 3,881,427 A * | 5/1975 | Blume | 105/141 |
| 4,708,294 A * | 11/1987 | Endom | 241/27 |
| 4,944,231 A * | 7/1990 | Leist | 104/287 |
| 5,013,101 A * | 5/1991 | Muth | 312/201 |
| 5,122,263 A | 6/1992 | Huber | |
| 5,277,125 A * | 1/1994 | DiFonso et al. | 104/292 |
| 5,737,850 A * | 4/1998 | Hendrix | 34/380 |
| 6,112,917 A * | 9/2000 | Baker et al. | 211/162 |
| 6,243,968 B1 | 6/2001 | Conrad et al. | 34/255 |
| 6,474,484 B1 * | 11/2002 | Miller, Jr. | 211/162 |
| 7,240,440 B2 * | 7/2007 | Delons | 34/93 |
| 2005/0235520 A1 * | 10/2005 | Dollhopf et al. | 34/666 |
| 2005/0241174 A1 | 11/2005 | Kolega et al. | |
| 2006/0050609 A1 * | 3/2006 | Kraus | 366/346 |
| 2010/0162589 A1 * | 7/2010 | Manor | 34/90 |
| 2012/0128547 A1 * | 5/2012 | Grosser | 422/291 |

FOREIGN PATENT DOCUMENTS

| | | | |
|---|---|---|---|
| EP | 0 413 940 A2 | 2/1991 | |
| EP | 1 621 522 A1 | 2/2006 | |
| FR | 2 637 968 A1 | 4/1990 | |
| FR | 2 930 175 A1 | 10/2009 | |
| GB | 977701 A | 12/1964 | |
| GB | 1021133 A * | 2/1966 | F26B 17/12 |
| GB | 2 039 351 A | 8/1980 | |
| WO | 2004/020922 A1 | 3/2004 | |

OTHER PUBLICATIONS

French Search Report, dated Mar. 14, 2011, from corresponding French application.

* cited by examiner

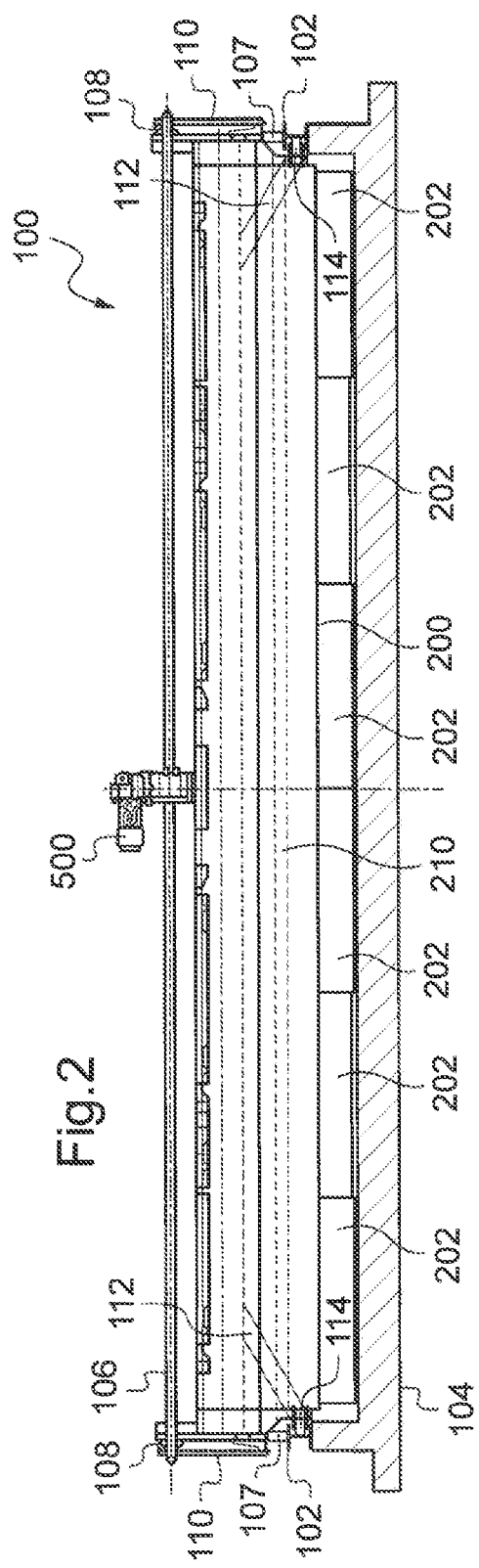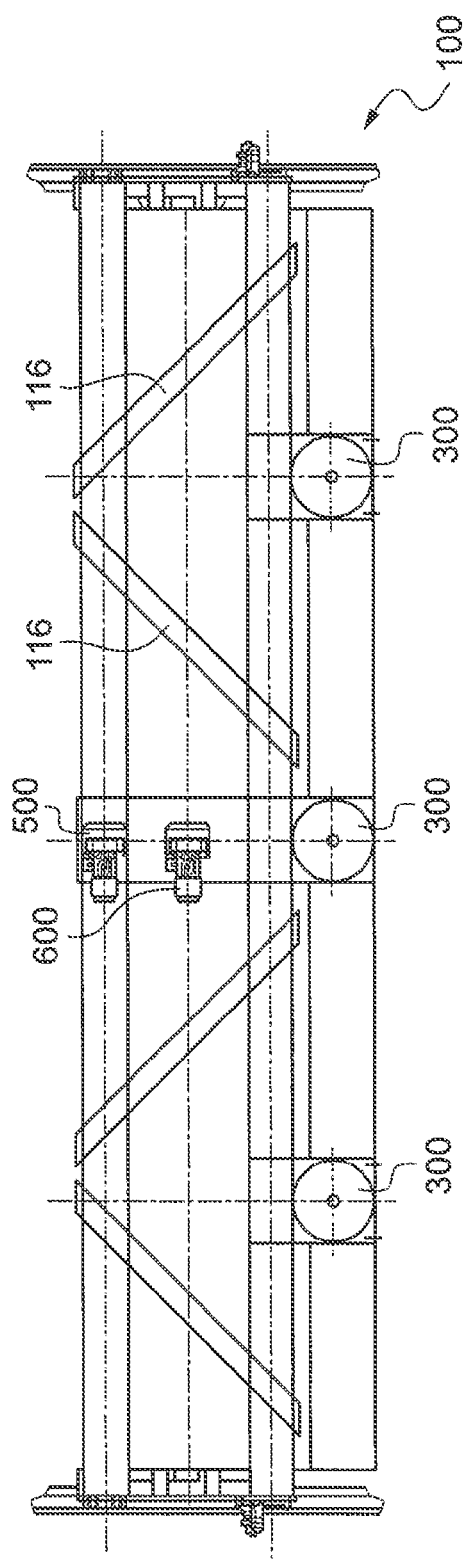

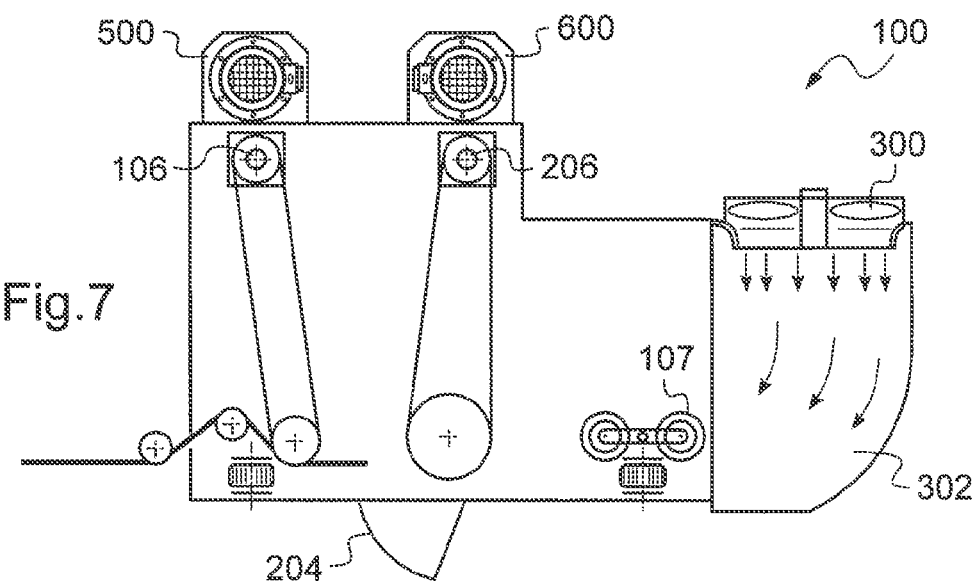
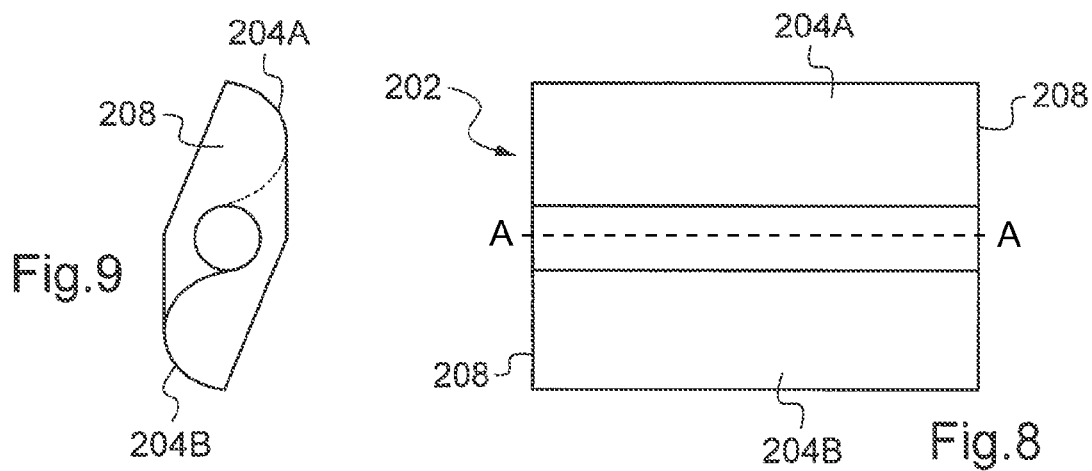
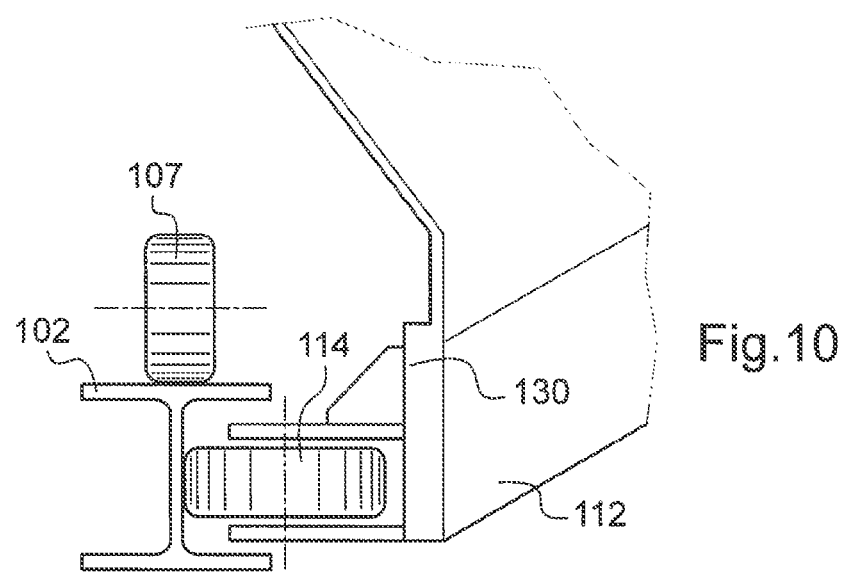

INSTALLATION FOR THE TREATMENT OF SLUDGES

The invention relates to an installation for the treatment of sludges, notably for drying them.

A great many industrial or urban operations generate waste which has to be subjected to various different end treatments. Mention may be made, for example, of the waste from purifying plants for industrial or municipal waste water or factories for the treatment of drinking water. This waste comprises in particular masses formed by biological and physico-chemical sludges.

Waste of this kind has to be subjected to more or less complex treatments for economic and/or ecological purposes. Moreover, there is certain legislation in place that imposes stringent statutory standards on the treatment of such waste.

Consequently, waste treatment nowadays is both widely practised and diverse.

The "sludge" component of waste is an appreciable fraction of the waste to be treated. Thus, treating sludges with the aim of increasing their value conventionally comprises thickening, dewatering and, optionally, drying them in certain plants.

The drying of sludges appears to be an important step as it makes it possible to reduce the volume of the sludges considerably. A small volume is important from the point of view of storage, transportation and/or disposal.

So-called thermal drying installations are known which carry out an air drying operation in a closed circuit comprising an outlet for moisture. However, this type of drying operation is subject to technical constraints which make it a costly and complex operation. Moreover, this type of installation involves high energy consumption, which may exceed 1000 kWh per tonne of water evaporated.

Solar drying installations are also known. The solar drying of sludges appears to be worthwhile as it enables the volume of the sludges to be reduced at investment and operating costs which are significantly more attractive than the costs of thermal drying.

It should be noted that solar drying installations for sludges are generally large in size with extensive and bulky equipment conventionally installed in a building of the greenhouse type. Any operating problem therefore substantially reduces the yield of the installation and furthermore risks causing serious nuisance in the immediate vicinity of the installation, particularly unpleasant smells connected with uncontrolled fermentation of the sludges. What is more, nowadays, continuous operation is the norm, as automated as possible.

To enable automation of the drying installations, a great many parameters have to be monitored to prevent problems ranging from the derailment of movable components to the moisture saturation of the air.

Alongside this, the energy balance increases with the complexity of the process carried out. It is therefore important to strike a balance between the simplest possible operation and a satisfactory energy balance, while taking account of the regulations that apply.

In order to optimise the operation or with a view to saving energy, the prior art proposes different installations and/or drying processes.

The document WO 2004/020922 A1 describes an apparatus for turning sludge. To prevent forced ventilation positioned in the roof of the greenhouse, the apparatus comprises fans driven on a frame which are positioned directly on means for turning the sludge. The fans provide for the renewal of the air contained in the greenhouse.

The document DE 43 15 321 A1 describes an installation that uses a combination of a transparent roof with powerful ventilation for drying the sludge. The installation uses solar energy to accelerate drying.

The document EP 0 413 940 A describes an installation comprising a pressing apparatus for squeezing the sludge and thus improving drying.

These known apparatus and/or processes are not, however, suitable for totally satisfactory operation capable of allowing automation while saving energy.

The present invention sets out to improve the situation.

To this end the invention proposes a sludge treatment installation of the type comprising an elongated floor having a work surface for accommodating a mass of sludge spread out thereon, substantially parallel guide rails arranged longitudinally on the floor, on either side of the work surface, a chain-type drive system arranged along the guide rails, a movable carriage arranged transversely above the work surface and comprising at least one toothed wheel meshing with the chain-type drive system and coupled to a first drive shaft for moving the movable carriage in longitudinal translation over the floor along the rails, the carriage carrying a rotary turning tool which is positioned transversely, in contact with said mass of sludge, wherein the turning tool is driven in rotation by a second drive shaft independent of the first, and this turning tool comprises pairs of semi-cylindrical paddles fixed substantially symmetrically by one of their edges, on either side of the second drive shaft, the two paddles in each pair being asymmetrical, because of their different radii, differing by at least about 5%.

According to one embodiment, the installation comprises fans with a vertical axis mounted at the front of the movable carriage, and a conveyor duct which starts from the outlet of the fans, and forms a deflector directly towards said paddles of the turning tool.

According to another embodiment, the chain-type drive system is disposed substantially horizontally on the floor and parallel to each guide rail.

According to another embodiment, the chain-type drive system comprises an advancing chain and a guide chain.

According to another embodiment, the installation comprises a stabilising system arranged perpendicularly with respect to each guide rail.

According to another embodiment, the installation comprises a beam combined with a wheel, which bears horizontally against each guide rail.

According to another embodiment, the floor comprises a heating system.

According to another embodiment, the driven shaft comprises a cylindrical tube having a sheet metal thickness of approximately equal to 4 mm.

According to another embodiment, one of the two paddles has a radius of between 150 mm and 220 mm.

According to another embodiment, a first paddle has a radius of about 180 mm and a second paddle has a radius of about 210 mm.

According to another embodiment, the movable carriage comprises a stabilising lattice formed by reinforcing bars.

Figure 4:
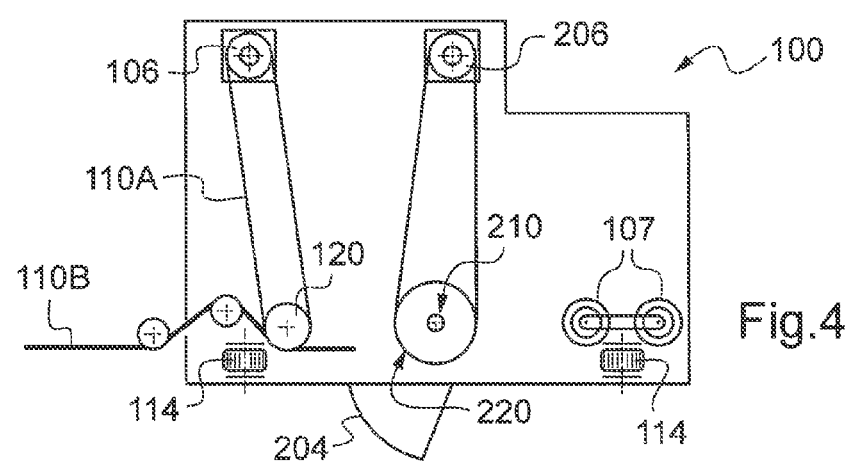
Figure 5:
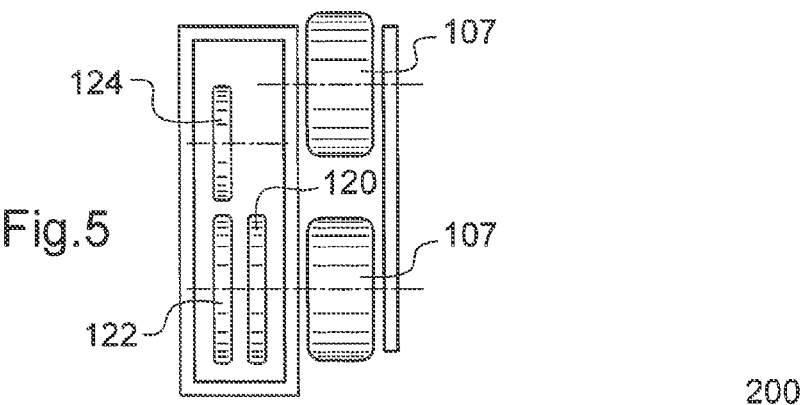
Figure 6:
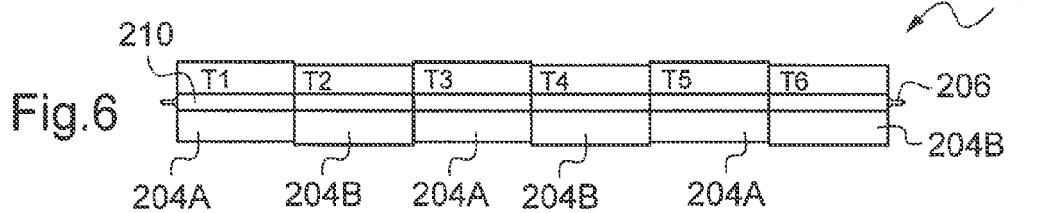

Further advantages and features of the invention will become apparent from a study of the detailed description that follows and the accompanying drawings, wherein:

FIG. 1 shows a general diagram of a sludge treatment installation in a greenhouse-type building according to one embodiment of the invention, FIG. 2 shows a front view of a sludge treatment installation according to one embodiment of the invention, FIG. 3 shows a plan view of a sludge treatment installation according to one embodiment of the invention, FIG. 4 shows a side view of a carriage in a sludge treatment installation according to one embodiment of the invention, FIG. 5 shows a plan view of a part of a chain-type drive system according to one embodiment of the invention, FIG. 6 shows a front view of a turning tool according to one embodiment of the invention, FIG. 7 shows a side view of a sludge treatment installation with fan and deflector according to one embodiment of the invention, FIG. 8 shows a front view of a pair of asymmetric semi-cylindrical paddles according to one embodiment of the invention, FIG. 9 shows a section along an axis A-A of the pair of paddles in FIGS. 8, and FIG. 10 shows a stabilising system according to the invention.

The drawings and the description that follow essentially contain elements of a specific nature. They form an integral part of the description and may therefore serve not only to assist with understanding the present invention but also contribute to its definition, in some cases.

FIG. 1 is a general diagram of a sludge treatment installation located inside a building 400 of the greenhouse type.

The installation comprises a floor 104 having a work surface to accommodate a mass of sludge 301 spread out thereon. By work surface is meant essentially the part of the floor 104 forming a bed of sludge 301. It is essentially a generally flat rectangular surface designed to hold sludge 301 for drying. The sludge 301 may be delivered by a screw conveyor.

Guide rails 102 are arranged substantially along the floor 104, i.e. parallel thereto and parallel to one another. From another viewpoint, the guide rails 102 are arranged longitudinally on either side of the work surface.

A double-chain drive system (with two separate chains) arranged along the guide rails (not shown in FIG. 1) moves a moving carriage 100 over the work surface. The moving carriage 100 is arranged transversely above the said work surface and is arranged so as to carry out longitudinal translation over the floor 104 while being supported on the guide rails 102.

The moving carriage 100 carries a turning tool 200. The turning tool 200 is therefore positioned transversely relative to the work surface of the floor 104.

The turning tool 200 is arranged so as to be in contact with the mass of sludge located on the work surface. More precisely, the turning tool 200 rotates and is almost in contact with the floor, so as to perform the function of turning the sludge over to the best possible degree. However, a safety gap has to be provided between the turning tool 200 and the floor 104 so as to prevent catching.

The turning tool 200, being carried by the carriage 100, moves longitudinally over the floor 104. Thus, the mass of sludge on the work surface is acted upon by the turning tool 200 over the entire length of the floor 104.

The floor 104 may be of more or less sophisticated design and in particular may be of the kind that provides underfloor heating.

According to one embodiment, the floor comprises a heating system with recycling of heat from the discharged effluent.

FIG. 2 shows a front view of a carriage 100. The carriage comprises a first drive shaft 106 actuated by a first motor 500. The drive shaft 106 comprises at its end part at least one toothed wheel 108 which meshes with a chain 110A of the chain-type drive system 110. A guide chain 110B of the chain-type drive system 110 is arranged along the guide rails to enable the carriage 100 to move by longitudinal translation together with the chain 110A.

The movable carriage 100 rests with its wheels 107 on the guide rails 102 in order to follow the motorised drive over the floor 104 by the chain-type drive system 110.

The sludge treatment installation in FIG. 2 comprises at least one stabilising system which is shown in more detail in FIG. 10. Each stabilising system is arranged perpendicularly to each guide rail 102. The stabilising system comprises at least one beam 112 and a wheel 114 assisted by a support element 130. The support element 130 may be formed by a reinforcement on the outer metal plate of the carriage 100 or by a strap provided on said plate, as shown in FIG. 10.

The stabilising system cooperates with the guide rail 102 and is supported thereon. More precisely, the beam 112 bears horizontally on each support element 130, notably in order to dissipate the forces and stresses which occur with the movement of the movable carriage 100 during the start-up of the sludge treatment installation. Preferably, the stabilising system comprises a wheel 114 for promoting guidance along the guide rail 102 and thus preventing the "skewing" of the movable carriage 100 and also minimising friction between the guide rail 102 and the stabilising system. Each wheel 114 bears horizontally against each guide rail 102.

The combination of the chain-type drive system 110, the guide rails 102, the stabilising system and the beams 112 imparts great stability to the installation during the longitudinal travel above the work surface. This goes hand in hand with an energy saving. This combination of elements also avoids skewing of the movable carriage 100.

As mentioned previously, the carriage 100 comprises a turning tool 200. According to the invention, the turning tool 200 is formed by a set of pairs of paddles 202 fixed to a shaft 210. Each pair of paddles is asymmetrical, being of different radii, and each paddle is fixed symmetrically with respect to the central axis of the said shaft.

The pairs of paddles 202 are semi-cylindrical and fixed substantially symmetrically by one of their edges on either side of the said shaft 210. According to the invention each pair of paddles 202 is asymmetrical on account of the different radii of each of the paddles with a difference of at least about 5%. The description will return to this subject later.

The shaft 210 is rotationally driven by a second drive shaft 206 independent of the first drive shaft 106 which is the source of movement of the movable carriage 100. The installation therefore comprises two distinct motorised systems with two distinct motors 500 and 600. Each motor thus supplies a system with a very different function: one causes movement and the other acts directly on the sludge.

FIG. 3 shows a plan view of a movable carriage 100. FIG. 3 shows the two motors 500 and 600 as different and independent of one another. Each one respectively drives a drive shaft: the first motor 500 drives a first drive shaft 106, the second motor 600 drives a second drive shaft 206.

The carriage 100 comprises fans 300 of vertical axis. The fans 300 are mounted at the front of the movable carriage 100. A conveying duct which starts from the outlet of the fans 300 forms a deflector directly towards the pairs of paddles 202 of the turning tool 200.

The movable carriage 100 also comprises reinforcing bars 116 which form a stabilising lattice. The reinforcing bars 116, like the beams 112, help to dissipate the stresses and forces occurring during the actuation of the sludge treatment installation.

FIG. 4 shows a side view of the movable carriage 100 according to the invention. The first drive shaft 106 drives a toothed wheel 120 via a chain 110A known as the advancing chain. FIG. 5 shows that the toothed wheel 120 is arranged on the same shaft as a second toothed wheel 122. The toothed wheel 122 is in contact with another chain 110B, known as the guide chain, arranged along the guide rails 102. The toothed wheel 122 cooperates with a toothed wheel 124 via the independent chain 110B.

The combination of the two chains 110A and 110B forms an integral part of the chain-type drive system 110. This chain-type drive system may be termed a double-chain drive system (with two distinct chains).

The two chains 110A and 110B are independent of one another and autonomous in their operation. In fact, whereas the chain 110A is designed to contribute to the advance of the carriage 100, the chain 110B essentially helps with the guiding of the carriage 100. This ensures good stability.

In fact, the chain-type drive system 110 is designed so that breakage of either of the two chains 110A or 110B does not directly affect the other one. It should be noted that in practice the chain 110B which is used essentially for guiding is significantly more prone to breakage than the chain 110A. Replacement of a single chain of the type 110A or 110B is relatively simple. Moreover, the advance of the movable carriage 100 is not affected in the event of breakage of the chain 110B thanks to the provision of the chain 110A which ensures the advance of the carriage 100.

It should therefore be understood that the general arrangement along the guide rails 102 of the chain-type drive system 110 is formed on the one hand by the guide chain 110B arranged along said rails 102 and on the other hand by the advancing chain 110A which essentially ensures advance of the movable carriage 100 along the guide rails 102.

The wheels 107 are arranged on the guide rail so as to guide the carriage 100. The wheels 107 help to bear the weight of the movable carriage 100.

FIG. 4 shows the second drive shaft 206 which drives the driven shaft 210. The two shafts interact via a chain in relation to a toothed wheel 220 provided on the driven shaft 210. FIG. 4 also shows a paddle 204 fixed to the driven shaft 210 and forming part of the turning tool 200.

FIG. 6 shows the turning tool 200 according to the invention in more detail. The turning tool 200 is formed by an even number of sections (T1-T6 in FIG. 6) of pairs of paddles 202. Each pair of paddles 202 consists of two paddles 204A and 204B. Naturally, the number of sections may vary particularly as a function of the length of the floor.

The two paddles 204A and 204B are each semi-cylindrical in shape and are each fixed substantially symmetrically by one of their edges on either side of the driven shaft 210.

The two paddles 204A and 204B of each pair of paddles 202 are asymmetrical as a result of having different radii, with a difference approximately equal to at least 5%.

To avoid an imbalance, the pairs of paddles 202 are arranged, on a driven shaft 210, on sections where a long paddle and short paddle are alternated in the longitudinal direction. In other words, a pair of paddles and the following pair are inverted through 180° relative to one another in a central plane, over the entire length of the turning tool 200. When the turning tool 200 is actuated, the asymmetry between the two paddles 204A and 204B ensures a substantial energy gain.

To reduce the energy expenditure still further, the sludge treatment installation may be equipped with fans 300 with a vertical axis, as shown in FIG. 7. The fans 300 with a vertical axis are mounted at the front of the movable carriage 100. A conveying duct 302 starts from the outlet from each fan 300 and forms a deflector directly towards the turning tool 200 and more precisely towards the said pairs of paddles 202 which form part of the turning tool.

The air blown by the fans 300 cooperates directly with the pairs of paddles 202 to promote rapid drying and thereby save energy.

FIG. 8 shows, more precisely, a pair of paddles 202 fixed to the driven shaft 210. Each pair of paddles 202 is laterally framed by cheeks 208. The two paddles 204A and 204B are asymmetrical and have different radii. The difference in radii between each of the two paddles 204A and 204B is at least 5%.

According to one embodiment, one of the two paddles has a radius of between 150 and 220 and preferably between 180 mm and 210 mm.

According to another embodiment, a first paddle has a radius of 188 mm and a second paddle has a radius of 203 mm. In this embodiment the difference in radius between the two paddles is about 7.5%.

FIG. 9 shows a cross-section through the pair of paddles 202 along the section axis A-A. An asymmetry appears in the pair of paddles 202 as a result of the different radii of the paddle 204A and the paddle 204B, respectively.

The driven shaft 210 may be formed with a cylindrical tube having a diameter approximately equal to 220 mm, the outer thickness of metal plate being equal to approximately 4 mm.

The independence of the chain-type drive system 110 and particularly the autonomy of each chain 110A and 110B in conjunction with the asymmetric paddles is the reason for an optimisation of the operating costs (continuity of production combined with an energy saving, in particular).

The prior art uses a single chain to drive a carriage. This known drive presents a problem of efficiency in some cases, particularly when the chain breaks, as the carriage is stopped immediately and it is necessary to wait for the repair to be done. The invention notably eliminates this shutdown step when the guide chain 110B breaks, thanks to the continued operation of the installation with the chain 110A and the turning tool. The repair can be made later.

Also, the independence of each drive shaft allows independent control of the respective elements connected to the said drive shaft. For example, it may prove expedient to accelerate the rotation of the paddles independently of an increase in the advance of the carriage. This can be achieved with the invention.

The Applicant has discovered, somewhat surprisingly, that a pair of asymmetric paddles with radii differing by at least 5% represents a substantial energy gain.

According to one embodiment, the turning tool is made up of a total of six alternating pairs of paddles 202, as shown in FIG. 6. In other embodiments the number of pairs of paddles varies as a function of the width of the floor. Each pair of paddles has a section length (the length of the drive shaft) of about 1.5 meters. In this embodiment the paddle 204A has a smaller radius than the paddle 204B, the radius of the paddle 204A being about 180 mm.

The invention claimed is:
1. Sludge treatment installation, comprising:
   an elongated floor having a work surface for accommodating a mass of sludge spread out thereon,
   substantially parallel guide rails (102) arranged longitudinally on the floor, on either side of the work surface,
   a chain drive system (110) arranged along the guide rails,
   a movable carriage (100) arranged transversely above the work surface and comprising at least one toothed wheel meshing with the chain drive system and coupled to a first drive shaft for moving the movable carriage in longitudinal translation above the floor along the rails, the carriage carrying a rotary turning tool (200) positioned transversely, in contact with said mass of sludge, the turning tool (200) being driven in rotation by a second drive shaft independent of the first, wherein the turning tool (200) comprises pairs of semi-cylindrical paddles fixed substantially symmetrically by one of their edges, on either side of a shaft (210) driven by said second drive shaft (206), the two paddles (204A; 204B) of each pair (202) being asymmetrical, because of their different radii, with a difference of approximately at least 5%, fans (300) of vertical axis mounted on the front of the movable carriage (100), and a conveying duct (302) which starts from the outlet of the fans, and forms a deflector directly towards said paddles of the turning tool (200).

2. Installation according to claim 1, wherein the floor comprises a heating system.

3. Installation according to claim 1, wherein the movable carriage comprises a stabilising lattice formed by reinforcing bars.

4. Installation according to claim 1, wherein one of the two paddles has a radius of between 150 and 220 mm.

5. Installation according to claim 1, wherein a first paddle has a radius of about 180 mm and a second paddle has a radius of about 210 mm.

6. Installation according to claim 1, wherein the chain-type drive system is disposed substantially horizontally on the floor and parallel to each guide rail.

7. Installation according to claim 1, wherein the chain-type drive system comprises an advancing chain (110A) and a guide chain (110B).

8. Installation according to claim 1, wherein a stabilising system is arranged perpendicularly with respect to each guide rail.

9. Installation according to claim 1, wherein a beam (112) combined with a wheel (114) bears horizontally against each guide rail (102).

10. Installation according to claim 1, wherein the driven shaft (210) comprises a cylindrical tube having a sheet metal thickness of approximately equal to 4 mm.

* * * * *